United States Patent
Guha et al.

(10) Patent No.: US 7,415,461 B1
(45) Date of Patent: Aug. 19, 2008

(54) APPARATUS AND METHOD FOR MERGING RESULTS OF APPROXIMATE MATCHING OPERATIONS

(75) Inventors: Sudipto Guha, Philadelphia, PA (US); Nikolas Koudas, Toronto (CA); Amit Marathe, Woodbridge, NJ (US); Divesh Srivastava, Summit, NJ (US)

(73) Assignee: AT&T Corp, New York, NY (US)

( * ) Notice: Subject to any disclaimer, the term of this patent is extended or adjusted under 35 U.S.C. 154(b) by 360 days.

(21) Appl. No.: 11/195,888

(22) Filed: Aug. 3, 2005

(51) Int. Cl.
*G06F 7/00* (2006.01)
(52) U.S. Cl. .................. 707/5; 707/3; 707/4; 707/7
(58) Field of Classification Search .................. 707/3–5, 707/7; 705/7–8, 37
See application file for complete search history.

(56) References Cited

U.S. PATENT DOCUMENTS

| | | | |
|---|---|---|---|
| 5,592,375 A | 1/1997 | Salmon et al. | |
| 5,956,707 A * | 9/1999 | Chu | 707/3 |
| 5,963,911 A * | 10/1999 | Walker et al. | 705/7 |
| 6,018,735 A | 1/2000 | Hunter | |
| 6,065,003 A | 5/2000 | Sedluk | |
| 6,363,377 B1 | 3/2002 | Kravets et al. | |
| 6,947,934 B1 * | 9/2005 | Chen et al. | 707/7 |
| 6,952,682 B1 * | 10/2005 | Wellman | 705/37 |
| 7,251,648 B2 * | 7/2007 | Chaudhuri et al. | 707/3 |
| 2003/0195836 A1 | 10/2003 | Hayes et al. | |
| 2004/0002973 A1 | 1/2004 | Chaudhuri et al. | |
| 2006/0074901 A1 * | 4/2006 | Pirahesh et al. | 707/5 |
| 2006/0173724 A1 * | 8/2006 | Trefler et al. | 705/8 |

OTHER PUBLICATIONS

Ilyas et al., Supporting top-k queries in relational database, Springer-Verlag New York, Inc., Sep. 2004, vol. 13, Issue 3, pp. 207-221.*
Nambiar et al., Mining Approximate Functional Dependencies and Concept Similarities to Answer Imprecise Queries, ACM Press, Jun. 2004, pp. 73-78.*
Marian et al., Evaluating Top-K Queries Over Web-Accessible Database, ACM Press, Jun. 2004, vol. 29, Issue 2, pp. 319-362.*

* cited by examiner

*Primary Examiner*—Apu Mofiz
*Assistant Examiner*—Jessica N Le (57) ABSTRACT

A device and a method are provided. Approximate match operations are performed for each of a group of attributes for each of a group of tuples with respect to a query to create a respective ranking for each of the group of attributes. The rankings of the group of attributes are combined to provide a ranking score for each of the group of tuples. Data representing a ranking score of each of the group of tuples is generated according to a position of a respective ranking of each one of the group of tuples for a first k positions of the ranking. K of top ranked ones of the group of tuples are identified based at least in part on the generated data, wherein a number of the group of tuples is n and k<n.

13 Claims, 11 Drawing Sheets

Relation R

| tuple id | custname | address | location |
|---|---|---|---|
| t1 | John Smith | 900 Mountain Av Springfield NJ | 5,5 |
| t2 | Josh Smith | 65 Mount Av Springfield NJ | 8,8 |
| t3 | Nicolas Smith | 800 Spring Av Union NJ | 11,11 |
| t4 | Joseph Smith | 100 Mt Road Springfield NJ | 9,9 |
| t5 | Jack Smith | 100 Springhill Lake Park MD | 6,6 |

FIG. 2B

: Query custname = 'John Smith' address = '100 Mount Rd Springfield NJ'  location = '5.1,5.1'
Ranking

| edit-distance (Qcustname,R(custname)) | similarity(Qaddress,R(address)) | distance(Qlocation,R(location)) |
|---|---|---|
| t1 | t2 | t1 |
| t2 | t1 | t5 |
| t5 | t4 | t2 |
| t4 | t3 | t4 |
| t3 | t5 | t3 |

FIG. 5A

$$\left\{\begin{array}{ccccc} 1 & 2 & 5 & 8 & 11 \\ 3 & 2 & 3 & 6 & 9 \\ 11 & 8 & 5 & 2 & 1 \\ 8 & 5 & 2 & 1 & 4 \\ 7 & 5 & 3 & 4 & 5 \end{array}\right\}$$

FIG. 5B

$$\left\{\begin{array}{ccccc} 0 & 0 & 3 & 7 & 10 \\ 2 & 0 & 1 & 5 & 8 \\ 10 & 6 & 3 & 1 & 0 \\ 7 & 3 & 0 & 0 & 3 \\ 6 & 3 & 1 & 3 & 4 \end{array}\right\}$$

FIG. 5C

$$\left\{\begin{array}{ccccc} 0 & 0 & 3 & 7 & 10 \\ 2 & 0 & 1 & 5 & 8 \\ 10 & 6 & 3 & 1 & 0 \\ 7 & 3 & 0 & 0 & 3 \\ 5 & 2 & 0 & 2 & 3 \end{array}\right\}$$

FIG. 5D

$$\left\{\begin{array}{ccccc} 0^* & 0 & 3 & 7 & 10 \\ 2 & 0^* & 1 & 5 & 8 \\ 10 & 6 & 3 & 1 & 0^* \\ 7 & 3 & 0^* & 0 & 3 \\ 5 & 2 & 0 & 2 & 3 \end{array}\right\}$$

FIG. 5E

$$\left\{\begin{array}{ccccc} 0^* & 0 & 3 & 7 & 10 \\ 2 & 0^* & 1 & 5 & 8 \\ 10 & 6 & 3 & 1 & 0^* \\ 7 & 3 & 0 & 0 & 3 \\ 5 & 2 & 0^* & 2 & 3 \end{array}\right\}$$

FIG. 5F

$$\left\{\begin{array}{ccccc} 0^* & 0 & 3 & 7 & 10 \\ 2 & 0^* & 1 & 5 & 8 \\ 10 & 6 & 3 & 1 & 0^* \\ 7 & 3 & 0 & 0^* & 3 \\ 5 & 2 & 0^* & 2 & 3 \end{array}\right\}$$

FIG. 7A $$\left\{\begin{array}{ccccc} 1 & 2 & M & M & M \\ 3 & 2 & M & M & M \\ 11 & 8 & M & M & M \\ 8 & 5 & M & M & M \\ 7 & 5 & M & M & M \end{array}\right\}$$

FIG. 7B $$\left\{\begin{array}{ccccc} M & M & M & 1 & 2 \\ M & M & M & 3 & 2 \\ M & M & M & 11 & 8 \\ M & M & M & 8 & 5 \\ M & M & M & 7 & 5 \end{array}\right\}$$

FIG. 7C $$\left\{\begin{array}{ccccc} 0^* & 0 & 0 & 0^* & 0 \\ 0 & 0^* & 0 & 2 & 0 \\ 0 & 0 & 0^* & 10 & 6 \\ 0 & 0 & 0 & 7 & 3 \\ 0 & 0 & 0 & 6 & 3 \end{array}\right\}$$

FIG. 7D $$\left\{\begin{array}{ccccc} 0 & 0 & 0 & 0^* & 0 \\ 0 & 0 & 0 & 2 & 0^* \\ 0 & 0 & 0^* & 10 & 6 \\ 0^* & 0 & 0 & 7 & 3 \\ 0 & 0^* & 0 & 6 & 3 \end{array}\right\}$$

*FIG. 8A*

```
CREATE PROCEDURE MHA(IN K integer, IN N integer
LANGUAGE SQL
BEGIN

Initialization for MHA
1. SET pivot = N;
WHILE (pivot > K) DO
    insert into Top values(pivot, pivot);
SET pivot = pivot - 1;
END WHILE;

SET pivot = K;
pivotiter:

WHILE (pivot ≥ 1) DO
2 delete from SimpleAugment;
    insert into SimpleAugment
        select Graph.elem, pivot
        from Graph
        where pos = pivot and cost = 0
          and elem not in (select elem from Top)
        fetch first 1 rows only;
    select count(*) into rcount from SimpleAugment;

IF (rcount > 0) THEN
    insert into Top
    select elem, pos
    from SimpleAugment;
    set pivot = pivot - 1;
iterate pivotiter;
END IF;

3. delete from Reach4;
    insert into Reach4(elem, parent)
        select Graph.elem, N+1
        from Graph
        where pos = pivot and cost = 0;
SET cold = 1;
SET found = 0;
    select count(*) into cnew from Reach4;

WHILE (found = 0 AND cnew > cold) DO
SET cold = cnew;
    insert into Reach4(elem, parent)
        select Graph.elem, min(Reach4.elem)
        from Reach4, Top, Graph
        where Top.elem = Reach4.elem
          and Top.pos ≤ K
          and Graph.pos = Top.pos and Graph.cost = 0
          and Graph.elem not in (select elem from Reach4)
        group by Graph.elem;
    insert into Reach4(elem, parent)
        select GTail.elem, min(Reach4.elem)
        fromReach4, Top, GTail
        where Top.elem = Reach4.elem
          and Top.pos > K
          and GTail.pos = COMMONCOL and GTail.cost = 0
          and GTail.elem not in (select elem from Reach4)
        group by GTail.elem;

select count(*) into cnew from Reach4;
    select count(*) into found
    from Reach4
    where Reach4.elem not in (select elem from Top);
END WHILE;
```

FIG. 8B

```
4. delete from Augment;
     insert into Augment
        select Reach4.elem
        from Reach4
           where Reach4.elem not in (select elem from Top)
        fetch first 1 rows only;
     select count(*) into rcount from Agument;

IF (rcount > 0) THEN
     delete from AugmentingPath1;
     insert into AugmentingPath1
     with AugmentingPath(elem, parent, level) as (
        select Reach4.elem, Reach4.parent, 0
        from Reach4, Augment
        where Reach4.elem = Augment.elem
        UNION
        select Reach4.elem, Reach4.parent,
              AugmentingPath.level+1
        from Reach4, AugmentingPath
        where Reach4.elem = AugmentingPath.parent
              and AugmentingPath.level <N)
        selcet elem, parent
        from AugmentingPath;
     insert into Top values(N+1, pivot);

delete from TempTop;
         insert into TempTop
         select AugmentingPath1.elem, Top.pos
         from Top, AugmentingPath1
         where Top.elem = AugmentingPath1.parent;

delete from Top
     where elem in
        (select parent from AugmentingPath1);
     insert into Top
        select * from TempTop;

SET pivot = pivot - 1;
iterate pivotiter;
END IF;

5. select min(cost) into elemposmin
     from Graph
     where elem not in
        (select elem from Reach4) and (
          pos = pivot or pos in (
          select Top.pos from Top, Reach4
          where Top.elem = Reach4.elem))
          and pos ≤ K;

update Graph
set cost = cost - elemposmin
  where elem not in (select elem from Reach4) and (
     pos = pivot or pos in
        (selet Top.pos from Top, Reach4
        where Top.elem = Reach4.elem))
        and pos ≤ K;

update Graph
set cost = cost + elemposmin
  where elem not in (select elem from Reach4) and (
     pos != pivot and pos not in (
     select Top.pos from Top, Reach4
     where Top.elem = Reach4.elem))
     and pos ≤ K;

update GTail
     set cost = cost + elemposmin
          where elem in (select from Reach4);
END WHILE
     delete from Top
          where pos > K;
END
```

```
CREATE PROCEDURE ssp(IN k integer, IN N interger)
LANGUAGE SQL
BEGIN
DECLARE index INTERGER DEFAULT 1;
DECLARE iter INTEGER DEFAULT 1;
DECLARE recount INTEGER;
DECLARE matchsum FLOAT DEFAULT 0;

1. delete from Top;
    insert into Top(elem, pos)
        select min(elem), pos
        from graph
        where pos = 1 and cost =
            (select min(cost)
            from graph where pos = 1)
        group by pos;

SET index = 2;
start:
WHILE (index ≤ k) DO
2. delete from R1;
    insert into R1(selem, delem, cost)
        select Top.elem, G2.elem, G2.cost - G1.cost
        from Top, Graph G1, Graph G2
        where Top.elem = G1.elem and
            Top.pos = G1.pos and Top.pos = G2.pos;

delete from Reach4;
        insert into Reach4(elem, parent, cost)
        select elem, N+1, cost
        from Graph
        where pos = index;

SET iter = 1;
WHILE (iter ≤ index) DO
    delete from RR;
        insert into RR(elem, parent, cost)
        select Y.elem, X.elem, X.cost + R1.cost
        from Reach4 X, R1, Reach4 Y
        where X.elem = r1.selem and Y.elem = R1.delem
            and X.cost + R1.cost < Y.cost;

delete from R41;
        insert into R41(elem, cost)
        select elem, min(cost)
        from RR
        group by elem;

delete from Reach4
        where elem in (select elem from R41);
        insert into Reach4(elem, parent, cost)
        select RR.elem, min(RR.parent), RR.cost
        from RR, R41
        where RR.elem = R41.elem
            and RR.cost = R41.cost
        group by RR.elem, RR.cost;

SET iter = iter+1;
END WHILE;
3. delete from Augment;
    insert into Augment
        select elem
        from Reach4
        where elem not in
            (select elem from Top)
        order by cost
        fetch first 1 rows only;

4. delete from AugmentingPath1;
    insert into AugmentingPath1
    with AugmentPath(elem, parent, level)as(
        select Reach4.elem, Reach4parent, 0
        from Reach4, Augment
        where Reach4.elem = Augment.elem
        UNION
        select Reach4.elem, Reach4.parent,
        AugmentingPAth.level+1
        from Reach4, AugmentingPath
        where Reach4.elem = AugmentingPath.parent
            and AugmentingPath.level < N)
    select elem, parent
    from AugmentingPath;

5. insert into Top values(N+1, index);
    delete from TempTop;
    insert into TempTop
        select AugmentPath.elem, Top.pos
        from Top, AugmentPath1
        where Top.elem = AugmentingPath1.parent;
    delete from Top
        where elem in
            (select parent from AugmentingPath1);
    insert into Top
        select * from TempTop;
SET index = index+1;
END WHILE;
END
```

APPARATUS AND METHOD FOR MERGING RESULTS OF APPROXIMATE MATCHING OPERATIONS

BACKGROUND OF THE INVENTION

1. Field of the Invention

The present invention relates to efficiently identifying approximate matches to a query string among a collection of attribute values in a relation, and more specifically to apparatuses and methods for identifying a top-k optimal final ranking of tuples that approximately match a query tuple.

2. Introduction

Data Cleaning, which is defined as the task of identifying and correcting errors and inconsistencies in data is an important process that has been at the center of research interest in recent years. A collection of attribute values in a relation is known as a tuple. Efficiently identifying approximate matches to a query string among a collection of attribute values in a relation is a key operation for effective data cleaning. Such techniques construct an ordering (ranking) of the relational tuples for the given query string based on different notions of approximate match including edit distance (and variants thereof) and cosine similarity.

One of the end goals of effective data cleaning is to identify the relational tuple or tuples that are "most related" to a given query tuple. Since multiple attributes could exist in the query tuple, issuing approximate match operations for each of them will effectively create an equal (to the number of attributes) number of rankings of the relation tuples. Combining the rankings to identify a final ranking and return a few highly ranking tuples to the application is a challenging task.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method of performing a database search is provided. Approximate match operations are performed for each of a group of attributes for each of a group of tuples with respect to a query to create a respective ranking for each of the group of attributes. The rankings of the group of attributes are combined to provide a ranking score for each of the group of tuples. Data representing a ranking score of each of the group of tuples is generated according to a position of a respective ranking of each one of the group of tuples for a first k positions of the ranking. K of top ranked ones of the group of tuples are identified based at least in part on the generated data, wherein a number of the group of tuples is n and k<n.

In a second aspect of the invention, a machine-readable medium including instructions for at least one processor is provided. The machine-readable medium includes instructions for performing approximate match operations for each of a group of attributes for each of a group of tuples with respect to a query to create a respective ranking for each of the group of attributes, instructions for combining the rankings of the group of attributes to provide a ranking score for each of the group of tuples, instructions for generating data representing a ranking score of each one of the group of tuples according to a position of a respective ranking of each one of the group of tuples for a first k positions of the ranking, and instructions for identifying k top ranked ones of the plurality of tuples based at least in part on the generated data, wherein a number of the group of tuples is n and k<n.

In a third aspect of the invention, a device is provided. The device includes at least one processor, storage for data and a group of instructions, and a bus arranged to permit communications between the at least one processor and the bus. The device is configured to perform approximate match operations for each of a group of attributes for each of a group of tuples with respect to a query to create a respective ranking for each of the group of attributes, combine the rankings of the group of attributes to provide a ranking score for each of the group of tuples, generate data representing a ranking score of each one of the group of tuples according to a position of a respective ranking of each one of the group of tuples for a first k positions of the ranking and identify k top ranked ones of the plurality of tuples based at least in part on the generated data, wherein a number of the group of tuples is n and k<n.

In a fourth aspect of the invention, a device is provided. The device includes means for performing approximate match operations for each of a group of attributes for each of a group of tuples with respect to a query to create a respective ranking for each of the group of attributes, means for combining the rankings of the group of attributes to provide a ranking score for each of the group of tuples, means for generating data representing a ranking score of each one of the group of tuples according to a position of a respective ranking of each one of the group of tuples for a first k positions of the ranking, and means for identifying k top ranked ones of the plurality of tuples based at least in part on the generated data, wherein a number of the group of tuples is n and k<n.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 8A and 8B illustrate an exemplary implementation of the modified Hungarian method in SQL;

FIG. 12 shows an implementation of a successive shortest path method implemented in SQL.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Exemplary System

Figure 1:
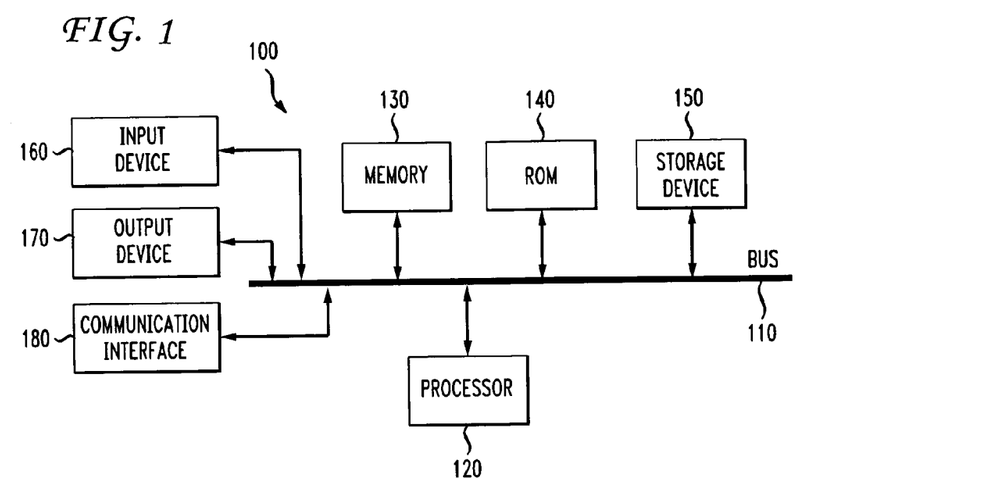
FIG. 1 illustrates an exemplary operating environment consistent with the principles of the invention.

FIG. 1 illustrates an exemplary processing system 100 that may be used to implement embodiments consistent with the principles of the invention. System 100 may include a bus 110, a processor 120, a memory 130, a read only memory (ROM) 140, a storage device 150, an input device 160, an output device 170, and a communication interface 180. Bus 110 may permit communication among the components of system 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media, such as, for example, magnetic or optical recording media and its corresponding drive.

Input device 160 may include one or more conventional mechanisms that permit a user to input information to system 100, such as a keyboard, a mouse, a pen, a voice recognition device, etc. Output device 170 may include one or more conventional mechanisms that output information to the user, including a display, a printer, one or more speakers, or a medium, such as a memory, or a magnetic or optical disk and a corresponding disk drive. Communication interface 180 may include any transceiver-like mechanism that enables system 100 to communicate via a network. For example, communication interface 180 may include a modem, or an Ethernet interface for communicating via a local area network (LAN). Alternatively, communication interface 180 may include other mechanisms for communicating with other devices and/or systems via wired, wireless or optical connections.

System 100 may perform such functions in response to processor 120 executing sequences of instructions contained in a computer-readable medium, such as, for example, memory 130, a magnetic disk, or an optical disk. Such instructions may be read into memory 130 from another computer-readable medium, such as storage device 150, or from a separate device via communication interface 180.

Description of the Problem

The majority of data cleaning techniques focus on the identification of problems on attribute values of string type (e.g., names, addresses etc.) which abound in customer related databases. They include techniques for indexed retrieval of strings based on notions of approximate string match (e.g., edit distance), correlating string attributes using string similarity predicates (e.g., cosine similarity, edit distance and variants thereof) and deploying algorithms and/or rule engines for automatically correcting/transforming strings into canonical forms. These techniques will successfully match a query string or a collection of strings approximately (for suitably defined notions of approximate match) against the values of a relational attribute in a relation R. For a given query string, such techniques can tag each attribute value with a score quantifying the degree of similarity (closeness) of the query string to the attribute value string. As a result, they can effectively return a ranking of the attribute values (and to an extent of the tuples in R) for the query string, with respect to that score. It is then up to the user, to observe the highest scoring attribute values and identify one(s) that should be declared as true approximate matches.

Figure 2A:
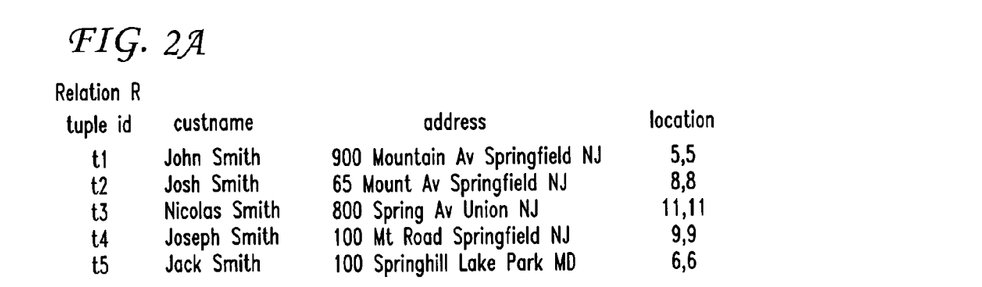
FIG. 2A illustrates exemplary tuples and rankings.
Figure 2B:
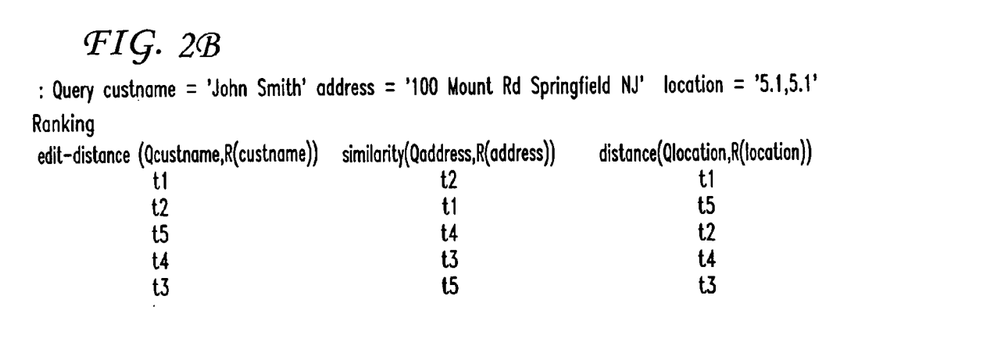
FIG. 2B illustrates results of ranking each attribute of the tuples of FIG. 2A and a method used to determine similarity to a corresponding query attribute.

Although such techniques are effective in identifying approximate matches between a string or a collection of strings and the values of a relational attribute, it is often the case that multiple attributes should be involved in the approximate match operation. Consider for example a relation R(custname, address, location), recording the name of a customer, the customer address, and the geographical coordinates (latitude, longitude) of the customer address. Suppose that one wishes to obtain approximate matches with tuples of R, given a set of attribute values Q (possibly obtained from a different database). Let $Q_{custname}$, $Q_{address}$, $Q_{location}$ be the attribute values specified in Q. For each of the attribute values one may assume there is an agreed upon methodology to generate approximate matches with tuples of R. The specific methodology used for each attribute is not relevant to implementations consistent with the principles of the invention. Any techniques known to those of skill in the art may be applied, either on one or multiple attributes. The particular choice may depend on several factors including attribute semantics and type. For example, using $Q_{custname}$ implementations could utilize the technique of deploying string edit distance to generate approximate matches with attribute values from attribute custname of R. This may effectively create an ordering (ranking) of relation R based on non-decreasing values of the edit distance between $Q_{custname}$ and R(custname). Such a ranking may be suitably thresholded using a desirable edit distance value (effectively maintaining only the tuples of R with edit distance less than or equal to that value). For $Q_{address}$ one could generate a list of approximate matches using the address attribute of R. A ranking of R may be obtained in this case as well, based on the cosine similarity of $Q_{address}$ and R(address). Finally, using $Q_{location}$ one could choose spatial closeness (in terms of some spatial norm, e.g., Euclidean distance) between $Q_{location}$ and R(location) and generate a corresponding list of matches (ranking of R). FIG. 2A presents an example of relation R. FIG. 2B illustrates results of ranking each of the attributes of the tuples of FIG. 2A and the method used to determine similarity to a corresponding query attribute. Notice that the resulting rankings depend heavily on the specific methodology applied to derive them.

Although in principle one could use the information conveyed by only one ranking to form an answer, this is not necessarily a good choice. For example, by observing the ranking obtained using $Q_{custname}$ it is not immediately evident that $t_1$ is a good answer. Although tuple $t_1$ has an attribute value which is at a smallest edit distance from $Q_{custname}$, the ranking obtained using $Q_{address}$ ranks $t_1$ second. As an additional example consider the ranking obtained using $Q_{location}$. Tuple $t_5$ ranks in the second position, but the rankings obtained using the other attributes rank $t_5$ rather poorly. Evidently, a more conclusive answer could be obtained by observing the positions and/or scores of the tuples in all rankings. This may be accomplished with the use of combining functions operating on the elements of the various rankings. For example, consider a combining function that sums the positions of the tuples in the various rankings. In this case notice that tuple $t_1$ achieves a better value in that sum with respect to any other tuple in R. Intuitively, $t_1$ could serve as a better answer to return to the user, as it is obtained by examination of all the query attributes and the results of all the induced rankings. It is evident that, in the presence of different rankings, principled techniques may be used to derive a final ranking by taking into account information conveyed by all rankings. Such principled techniques may be realized as combining functions operating on the elements of rankings. The derivation of a final ranking may then be cast as an optimization problem over the values of such combining functions. Given that a variety of approximate match operations are fully expressible in a declarative way, rankings may be easily generated in, for example, a relational database management system (RDBMS), by directly operating on R using a database retrieval language, such as, for example, SQL. Thus, rankings may be readily materialized as relations. Consequently, to facilitate ease of use, it may be desirable to express methodologies that combine the information conveyed by the rankings in a declarative way as well.

DEFINITIONS

Let R be a relation of cardinality n consisting of m attributes and let $t_1, \ldots, t_n$ denote the tuples of R. A ranking of R is an ordered list $\tau=\{x_1 \geqq x_2 \ldots \geqq x_n\}$, where $x_i \in R$ and $\geqq$ is some ordering relation on R. Such a ranking may be obtained by applying a suitable approximate match operation between a query value and the values of an attribute of R. Without loss of generality, assume that rankings of R are complete in the sense that every $t_i \in R$ belongs to the ranking. If this is not the case (for example, if the approximate match predicate can be thresholded) and the ranking contains $S \subset R$ tuples, a complete ranking may be obtained by padding a partial ranking at position $|S|+1$ with all the 'missing' R-S tuples. Semantically, this declares an indifference about the relative ordering of the missing tuples and all may be equivalently placed at the end of the obtained ranking. For a ranking $\tau$, the notation $\tau(t_i)$ may be used to refer to the position of tuple $t_i$ in the ranking (a highly ranked tuple may have a low numbered position). At times an approximate match operation used to generate a ranking may provide an approximate match score. In such a case, the notation $\tau_s(t_i)$ may be used to refer to the approximate match score of tuple $t_i$ in $\tau$.

Given a query $t_q$ with m values, let $\tau_1, \ldots \tau_m$ denote the resulting rankings of R after applying approximate match operations on corresponding values of $t_q$ and attributes of R. Combining functions may be deployed to synthesize new rankings of R out of $\tau_1, \ldots \tau_m$. In other implementations consistent with the principles of the invention, metric combining functions may be deployed. For the sake of simplifying the application, one instance of such a function is adopted for the remainder of the application, namely the footrule distance. The actual methodology used may be orthogonal to the choice of a metric combining function.

Let $\sigma$ and $\tau$ be two rankings of R. The footrule distance is the sum of the absolute distance between the two rankings as defined as $F(\sigma,\tau)=\Sigma_{i=1}^{n}|\sigma(t_i)-\tau(t_i)|$. Thus, the footrule distance is the sum of the absolute differences of the positions of tuples of R in the two rankings. Notice that $F(\sigma,\tau)$ can be divided by $$\frac{n^2}{2}$$

if n is even or $$\frac{n^2-1}{2}$$

if n is odd (the maximum value may be attained when rankings are ordered in opposite ways) and a normalized value between 0 and 1 can be obtained. $F(\sigma,\tau)$ can be defined over the approximate match scores of the corresponding rankings, $\sigma_s(t_i), \tau_s(t_i), \forall i, 1 \leqq i \leqq n$. The footrule distance between rankings $\sigma$ and $\tau_1, \ldots \tau_m$ is defined as $F(\sigma,\tau_1, \ldots \tau_m)=\Sigma_{i=1}^{m}F(\sigma,\tau_i)$. To a large extent any interpretation of results obtained will be in terms of this distance measure. While such a measure seems natural it's goodness will not be discussed, because the choice is primarily for exposition purposes and any other metric combining function will suit the purposes equally well.

Top-k Selection Problem

Given a query tuple $t_q$ specifying m attribute values let $\tau_i$, $1 \leqq i \leqq m$ be the rankings obtained as a result of approximate match operations on R. The top-k selection problem aims to efficiently identify the first k (for a user specified parameter, k) tuples of the ranking $\sigma$ of R that minimizes $F(\sigma,\tau_1, \ldots \tau_m)$.

The first k tuples of the ranking $\sigma$ of R may be derived as a result of the minimization of $F(\sigma,\tau_1, \ldots \tau_m)$. Each tuple $t_i$ in $\sigma$ may be tagged with a score, referred to as the ranking score as the result of this minimization. A tuple $t_i$ at position j, $1 \leqq j \leqq k$, in $\sigma$ has a ranking score $\sigma_r^{t_i}(j)=\Sigma_{l=1}^{m}|\tau_l(t_i)-j|$. The answer to the top-k selection problem is a set of cardinality k, of tuple $t_i$ (from R), position and ranking score triplets that among all possible mappings of the tuples of this set to positions j, $1 \leqq j \leqq k$, $\Sigma_{j=1}^{k}\sigma_r^{t_i}(j)$ is minimized. The notation $(t_i,j, \sigma_P^{t_i}(j))$ is used to refer to an element of the answer set of the top-k selection problem.

The top-k selection problem may be modeled as an instance of the minimum cost perfect matching problem. Given a bipartite graph $G=(N_1, N_2)$ with an edge set E and $|N_1|=|N_2|$, let $c_{ij}, i \in N_1, j \in N_2$ be the edge cost associated with each edge in E. A minimum cost perfect matching in G is the set of edges $E' \subset E$ of minimum cumulative cost, such that each $i \in N_1$ is incident to exactly one $j \in N_2$ in E' and vice versa. The solution to the minimum cost perfect matching may be reached by solving a linear program minimizing the overall sum of edge costs.

Given rankings $\tau_i$, $1 \leqq i \leqq m$ provided as a result of approximate match queries on R a bipartite graph G is constructed as follows. Assume that each ranking $\tau_i$ is a complete ranking of R (thus contains n tuples). n nodes may be instantiated corresponding to each tuple $t_1, \ldots t_n$ of R and n nodes corresponding to positions 1 through n of the target ranking σ. For each of the $n^2$ pairs of tuples $t_i$ and positions j with $1 \leq i, j \leq n$, the edge $(t_i, j)$ is introduced with a ranking score (cost) $\sigma_r^{\tau_i}(j) = \sum_{l=1}^{m} |\tau_l(t_i) - j|$. This will instantiate a full bipartite graph G. A solution of the minimum cost perfect matching problem on G may produce a minimum cost assignment of each of the n tuples to exactly one of the n positions, such that no two tuples are assigned to the same position.

Figure 3:
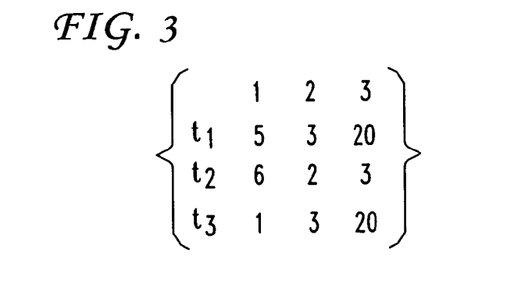
FIG. 3 shows an exemplary matrix representation of a bipartite graph.

The top-k selection problem is an instance of the minimum cost perfect matching problem, in which interest is restricted to identifying only the k tuples of R matching the first k positions of σ having minimum sum of ranking scores (minimum cost). Notice that a solution to the minimum cost perfect matching problem on G may not necessarily yield a solution to the top-k selection problem. The functions being optimized in each case may have different domains. As a result, the set of tuples extracted from a solution to the minimum cost perfect matching problem on G restricted to the first k positions might be vastly different from the set of tuples comprising a solution to the top-k selection problem. To illustrate this point consider the following example. Let G consist of three tuple vertex nodes and three position nodes. The matrix representation of G with each entry expressing the cost associated with the corresponding edge is shown in FIG. 3. A solution to the top-2 problem for this graph is $\{t_3, t_2\}$ but the minimum cost perfect matching solution is $\{t_3, t_1, t_2\}$.

The Hungarian Algorithm (HA)

Let S be an n×n matrix, corresponding to a matrix representation of the bipartite graph G, with elements $\sigma_r^{\tau_i}(j)$, $1 \leq i, j \leq n$. The well-known Hungarian algorithm solves the minimum cost perfect matching problem by providing a solution to the corresponding linear programming problem established on S.

Konig's theorem states that for a square matrix A, the maximum number of independent zeros of A is equal to the minimum number of lines required to cover all the zeros in A.

Figure 4:
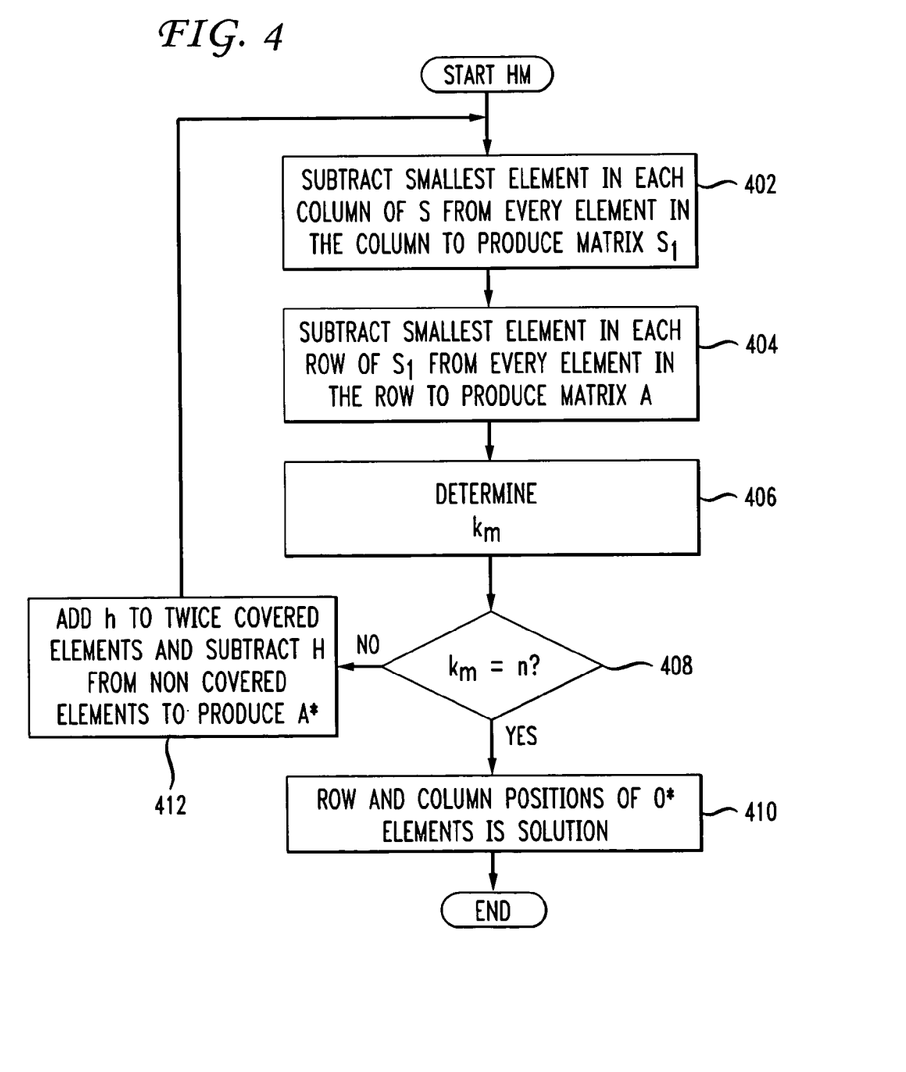
FIG. 4 is a flowchart that illustrates an exemplary process for implementing a Hungarian Algorithm.
Figure 5A:
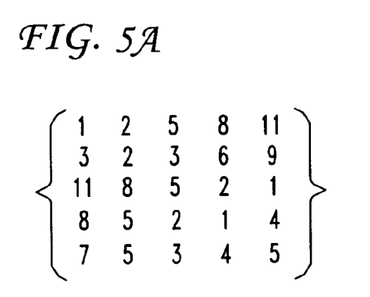
FIGS. 5A-5F illustrate a matrix representation of a bipartite graph during various stages of execution of the Hungarian method shown in the flowchart of FIG. 4
Figure 5B:
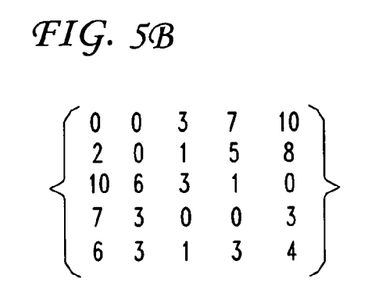
Figure 5C:
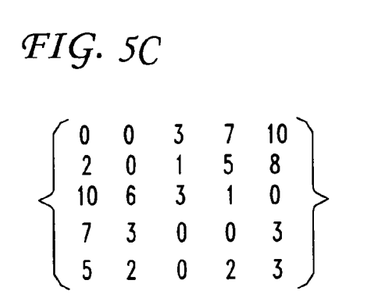

FIG. 4 is a flowchart that illustrates a process that implements the HA. FIG. 5A is an initial matrix, S, that will be acted upon as the process is explained with reference to the flowchart of FIG. 4. First, the process may begin by subtracting the smallest element in each column of S from every element in the column to produce matrix $S_1$ (act 402; FIG. 5B). Then the smallest element in each row of $S_1$ may be subtracted from every element in the row to produce matrix A, which is also known as standard form (act 404; FIG. 5C). Next, $k_m$ may be determined (act 406). If $k_m = n$, then the method includes establishing that row and column positions of 0* elements is a solution (act 410).

Figure 5D:
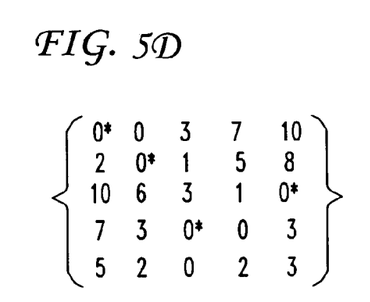
Figure 6A:
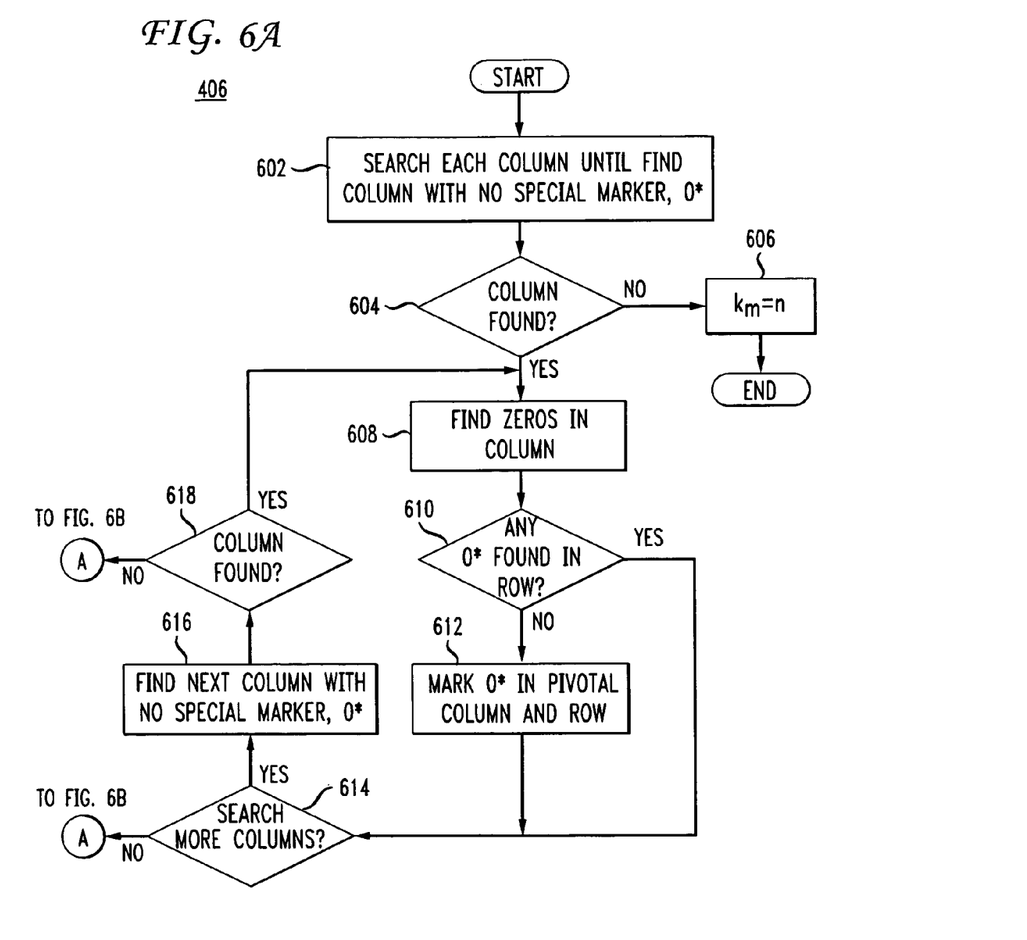
FIGS. 6A and 6B are flowcharts that illustrate an exemplary process that may be used in implementations consistent with the principles of the invention.
Figure 6B:
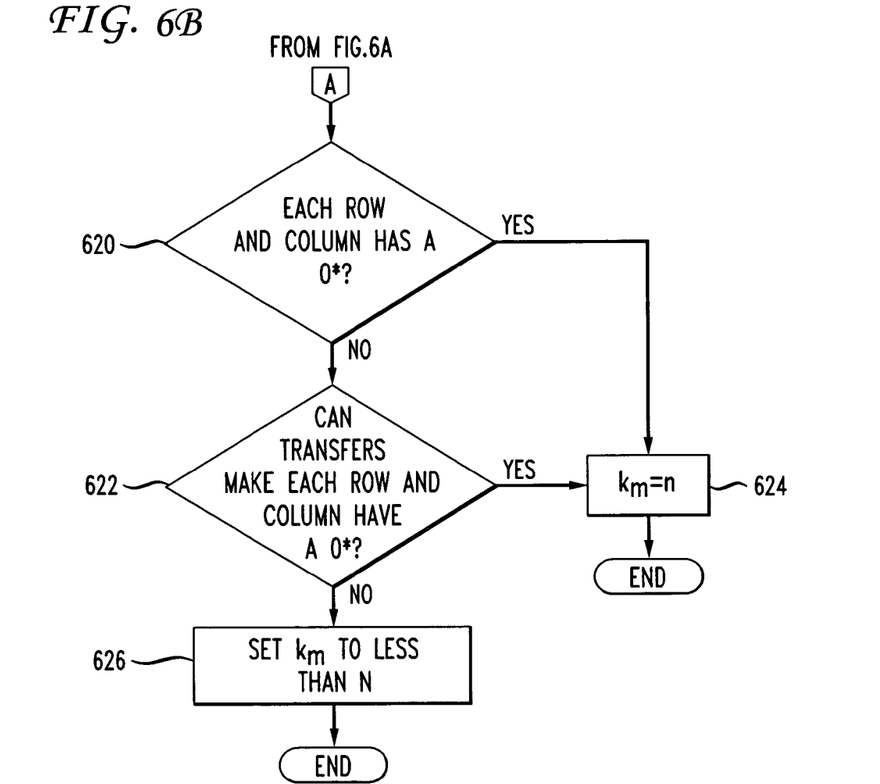

FIGS. 6A and 6B are flowcharts that illustrate an exemplary process for determining $k_m$. Before performing the process of FIGS. 6A and 6B, each column of the matrix may be examined for a zero entry from, for example, top to bottom, starting from, for example, a leftmost column. When a zero entry is found, and no 0* entry already exists in the same row and column, then the zero entry may be changed to 0*. FIG. 5D illustrates the results of this process.

Next, each column of the matrix may be searched until a column with no special marker 0* is found (act 602). Column 4 is such a column (act 604; FIG. 5D). If such a column is not found, then $k_m$ may be set equal to n (act 606) and the process is completed and returns to act 408. Otherwise, as is the case in this example, the zeros in the column may be found (row 4, col. 4) (act 608). Next, a check may be made to determine whether any 0* entries exist in the same row as any found zeros in the column (act 610). In this example, a 0* exists in the same row as the zero found in col. 4. If no 0* is found, then the current zero entry may be changed to a 0* (act 612).

Next, a check is made to determine whether additional columns exist to be searched (act 614). If one or more columns exist to be searched, then a search for the next column without a 0* entry may be performed (act 616). If a column is found, as is not the case in this example, then after checking if a column is found (act 618), acts 608-618 may be repeated. If no such column is found, as is the case in this example, then a check may be performed to determine whether each row and column of the matrix has a 0* entry (act 620: FIG. 6B). In our example, the fifth row does not have any 0* entries.

Figure 5E:
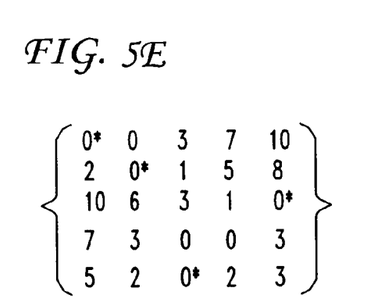
Figure 5F:
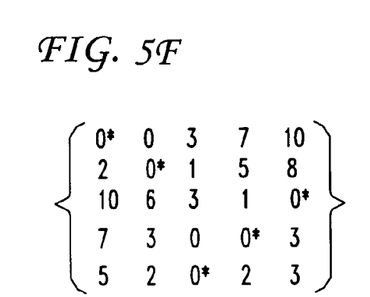

Next, a check is made to determine whether any transfers can be done to increase the number of rows or columns having a 0* entry (act 622). A 0* can be transferred to a zero entry in the same row or column. With reference to the matrix of FIG. 5D, the 0* entry in row 4, col. 3 may be transferred to row 5, col. 3, resulting in the matrix of FIG. 5E. Further, because a zero entry exists in the transferring row (row 4) and the column containing the zero entry (col. 4) has no 0* entries, then the zero entry at row 4, col. 4 may be changed to a 0*, resulting in the matrix shown in FIG. 5F. Thus, in this example, the check at act 622 will determine that, after transfers, each row and column has a 0* entry. Then $k_m$ may be set to n (act 624). Otherwise, $k_m$ may be set to another value, such as a value less than n (act 626).

Returning to the flowchart of FIG. 4, a determination may be made regarding whether $k_m = n$ (act 408). In the example, $k_m = n$, therefore, the row and column positions of the 0* elements provide the solution. For example, with reference to FIG. 5F, the solution is $(t_1, t_2, t_5, t_4, t_3)$.

If, at act 408, $k_m$ is determined to not be equal to n, then let N denote the matrix of non-covered elements. An element is covered if it is in a row or a column that has a 0* entry. Let h be the smallest element in N. h may then be added to each twice covered element of the matrix and subtracted from each non-covered element of the matrix to produce matrix A* (act 412). Acts 402, 404 and 406 may again be performed.

The top-k selection problem cannot be solved by a direct application of the above procedure because an answer to the minimum cost perfect matching problem restricted to the first k positions may not necessarily be an answer to the top-k selection problem. However, it is possible to modify the procedure in a way such that derivation of a solution to the top-k selection problem becomes possible.

In the top-k selection problem one is only interested in the first k positions of the ranking. Thus, when realizing matrix A for a supplied k value, only the elements $\sigma_r^{\tau_i}(j)$, $1 \leq i \leq n$, $1 \leq j \leq k$ of A may be computed. Algorithm HA, however, requires a square matrix (of size $O(n^2)$) to operate correctly since it solves an n×n matching problem (otherwise the corresponding program may be under specified).

The HA process may be utilized for the top-k selection problem by inserting a large positive constant for each of the remaining n(n−k) elements. This serves two purposes: (a) it creates a square A matrix as required by method HA and (b) it guarantees that the solution extracted from the solution of the corresponding minimum cost perfect matching on A is a correct solution to the top-k selection problem. By inserting a large positive constant in the corresponding positions of A, essentially edges of very high cost are added on the corresponding bipartite graph. Because such edges are of high cost they can never participate in an assignment concerning the first k positions.

A natural question arises regarding the necessity of those n(n−k) additional elements for the method's correctness. The basic form of execution of the HA method for the top-k selection problem requires inserting and maintaining these additional n(n−k) values. To see this consider the following: at any iteration of the method, when searching for the maximum number of independent zeros it is possible that act 412 of the method executes. Let i be the column that instigates the execution of act 412. Notice that during the execution of act 412 the contents of any of the elements of matrix A might change but the contents of column i do not. As a result, the contents of column i (for any a) are always required, because they might be affected in later iterations. Consequently, all columns have to be maintained during the entire execution of the method, bringing the total space requirement to $O(n^2)$.

From a performance standpoint, such an adaptation of HA for the top-k selection problem only reduces the initial overhead of constructing matrix A. Subsequent operations however, will be on the entire matrix A of $n^2$ elements. The running time of this procedure is $O(n^3)$ since each of the n columns will be considered and in the worst case the method will have to examine $O(n^2)$ elements in A for each column considered.

Modified Hungarian Algorithm (MHA)

Some implementations consistent with the principles of the invention may employ a modified Hungarian Algorithm (MHA) algorithm for the top-k selection problem, which may operate in space $O(nk)$. One observation regarding the operation of algorithm MHA is that since the algorithm provides a solution to a linear program, the optimal solution is not affected by a rearrangement of the columns of matrix A. Thus, in some implementations, matrix A may be populated as follows: insert a large positive constant to positions (i,j) of A with $1 \leq i \leq n$, $1 \leq j \leq n-k$ and populate the remaining positions with nk ranking scores $\sigma_r^{t_i}(j)$, $1 \leq i \leq n$, $1 \leq j \leq k$ at matrix positions $1 \leq i' \leq n$, $n-k+1 \leq n$. Denote the resulting matrix as A'. MHA operates similarly to HA on matrix A'. HA may then be performed on the modified matrix. While searching for the maximum independent number of zeros in the first n−k columns, a 0* may be placed in positions (l,l) $1 \leq l \leq n-k$ of A' immediately. This may be done because once A' is in standard form, positions $1 \leq i \leq n$, $1 \leq j \leq n-k$ of the matrix are all zero. The following invariant holds at any point in the execution of the MHA process or algorithm in implementations consistent with the principles of the invention:

INVARIANT 1—All columns from 1 to n−k are identical, differing only in the positions of their 0*'s. Moreover, for any row containing no 0*'s the corresponding entry for this row and any column j, $1 \leq j \leq n-k$ is 0.

As a result of this invariant, it is evident that it is not necessary to explicitly materialize the entire n×(n−k) sub matrix of A' with large positive values. It is sufficient to only maintain $O(n)$ values representing the state of all the elements of the A' matrix in the first n−k columns. This has the potential for improved efficiency and performance in implementations as method MHA has to operate on a matrix of size $O(nk)$ as opposed to one of size $O(n^2)$ as method HA does. The final solution is now represented by the position of the 0*'s in columns n−k+1 . . . n.

FIGS. 7A-7D present an exemplary operation of algorithm MHA on the data of FIGS. 2A and 2B. For purposes of exposition, the entire matrix is illustrated during the execution presented in FIGS. 7A-7D. Notice that for this top-2 example, only 15 (3*n) entries may be explicitly maintained.

Figure 7A:
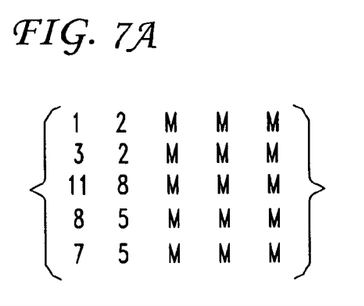
FIGS. 7A-7D present a matrix representation of a bipartite graph during various stages of performing an exemplary modified Hungarian method on the data of FIGS. 2A and 2B.
Figure 7B:
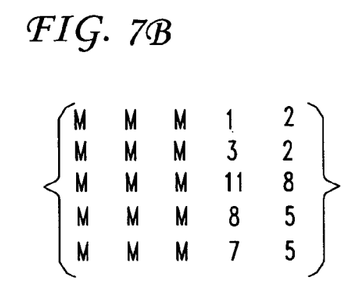
Figure 7C:
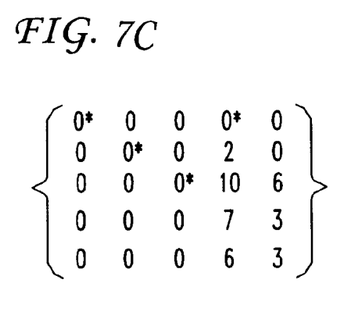
Figure 7D:
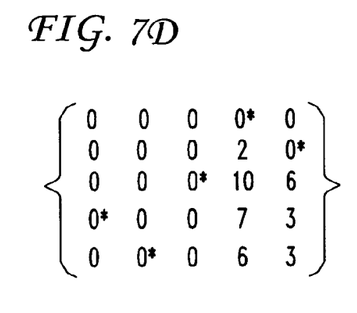

FIG. 7A shows an initial matrix suitable for a top-2 problem. FIG. 7B illustrates the matrix after columns are rearranged. FIG. 7C shows a conflict in row 1, cols. 1 and 4. In the next iteration another conflict appears between row 2, columns 5 and 2. The 0* in column 2 is moved to row 5 column 2 and a 0* is placed at column 5, row 2. FIG. 7D shows the final solution of $t_1$, $t_2$.

FIGS. 8A and 8B illustrate an exemplary MHA process written in procedural SQL.

Successive Shortest Paths (SSP)

Figure 9:
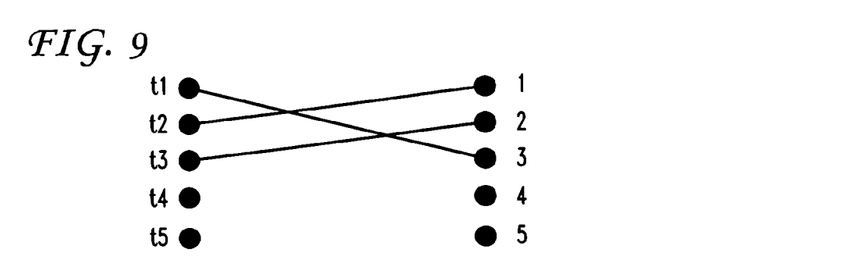
FIG. 9 illustrates an exemplary bipartite graph.

Successive Shortest Paths (SSP) is an alternative solution to the top-k problem. FIG. 9 presents an example of a top-k selection problem represented as an instance of a minimum cost perfect matching problem. With an exemplary database consisting of five tuples the corresponding full bipartite graph G is constructed. An edge between a node $t_i$ and a position j in FIG. 9 is assumed to have a ranking score (cost) of $\sigma_r^{t_i}(j)$. The nodes in G corresponding to tuples ($t_1$ to $t_5$) may be referred to as tuple vertices and to the nodes corresponding to positions (1 through 5) as position vertices (or simply positions). Observe, in an inductive way, issues that may arise when, having constructed a top-i answer, one wishes to extend the answer and construct a top-(i+1) answer.

First, constructing a top-1 answer given the graph of FIG. 9 is an easy task. One may just select the edge with minimum ranking score incident to position 1. The corresponding tuple (for example, tuple $t_3$ in FIG. 9) may be the top-1 answer. Assume that through some mechanism the top-i answers (e.g., i=3 in FIG. 9) may be identified. Using the top-i solution to construct the top-(i+1) solution two cases of interest arise; i=3 in FIG. 9 illustrates these cases. Assume that the top-3 solution ($t_i$,j), $1 \leq j \leq 3$ identified is $S_{top-3} = \{(t_2, 1), (t_3, 2), (t_1, 3)\}$. Thus, the associated total cost of the top-3 solution is $C_{top-3} = \sigma_r^{t_2}(1) + \sigma_r^{t_3}(2) + \sigma_r^{t_1}(3)$. Constructing the top-4 solution may involve including a new (un-matched) tuple in the solution set.

The first case arises when following a direct edge from position 4 (position (i+1)) to a tuple which is currently un-matched (i.e., not present in the top-3 solution). In this case a candidate solution can be constructed by adding the new element ($t_4$, 4) to the current top-3 set. A top-4 candidate solution may be obtained as a direct extension of the current top-3 solution. If the total cost of the top-3 solution plus the ranking score (cost) of the new tuple (say tuple $t_4$ in FIG. 9) assigned at position 4 is minimum (among all possible four-tuple sets assigned to positions 1 through 4), then this is the top-4 solution. When a path is followed from position 4 via some other tuple vertex (or vertices) currently in $S_{top-3}$ in the bipartite graph, to a tuple which is currently un-matched, a second case arises. Consider, for example, the path from position 4 to tuple vertex $t_3$ to position 2 and back to tuple $t_4$ (which is currently un-matched). This path defines a new candidate solution which can be obtained by modification of $S_{top-3}$ by removing ($t_3$, 2) and adding ($t_3$, 4), ($t_4$, 2) with a total cost $C_{top-3} + \sigma_r^{t_3}(4) + \sigma_r^{t_4}(2) - \sigma_r^{t_3}(2)$. Notice that if more than one already matched vertices in $S_{top-3}$ are present in the path a similar expression for the total cost can be obtained by adding to $C_{top-3}$ the ranking scores associated with the edges that are not present in $S_{top-3}$ and subtracting the ranking scores associated with the edges present in $S_{top-3}$. The top-4 solution can be derived by identifying the path with the lowest cost, among all possible paths from position 4 to an unmatched tuple vertex and making the suitable modifications to $S_{top-3}$ in order to derive $S_{top-4}$.

One observation from the above discussion is that during the construction of the top-i solution the entire graph G is not needed. The computation may be correctly performed by manipulating $G_t$, the bipartite subgraph of G corresponding to the first i positions. Paths involving positions greater than i will be considered at later steps, incrementally towards k.

The above example leads to a natural procedure, the successive shortest paths (SSP) method to incrementally evaluate the answer to a top-k selection problem. An exemplary flowchart of the method is presented in FIG. 10. The process may begin with i set to one and the cost of $S_1$ calculated as the cheapest edge at position one (act 1002). Next, a check may be made to determine whether i=k (act 1004). If i=k, then $S_{top-k}$ has been calculated and the process is completed. Otherwise, i may be incremented (act 1006). Starting from position i, the transitive closure to all currently unmatched vertex nodes in subgraph $G_i$ may be computed (act 1008). Next, the cost of each path in the closure accounting may be computed. The negative edge cost may be computed when traversing an edge in $S_{i-1}$ and the positive edge cost when the edge is not in $S_{i-1}$ (act 1010). The edges in the cheapest path may be identified and $S_{i-1}$ may be modified accordingly to obtain $S_i$ (act 1012). Acts 1004 through 1012 may then be repeated until i is determined to be equal to k, at act 1004.

Figure 10:
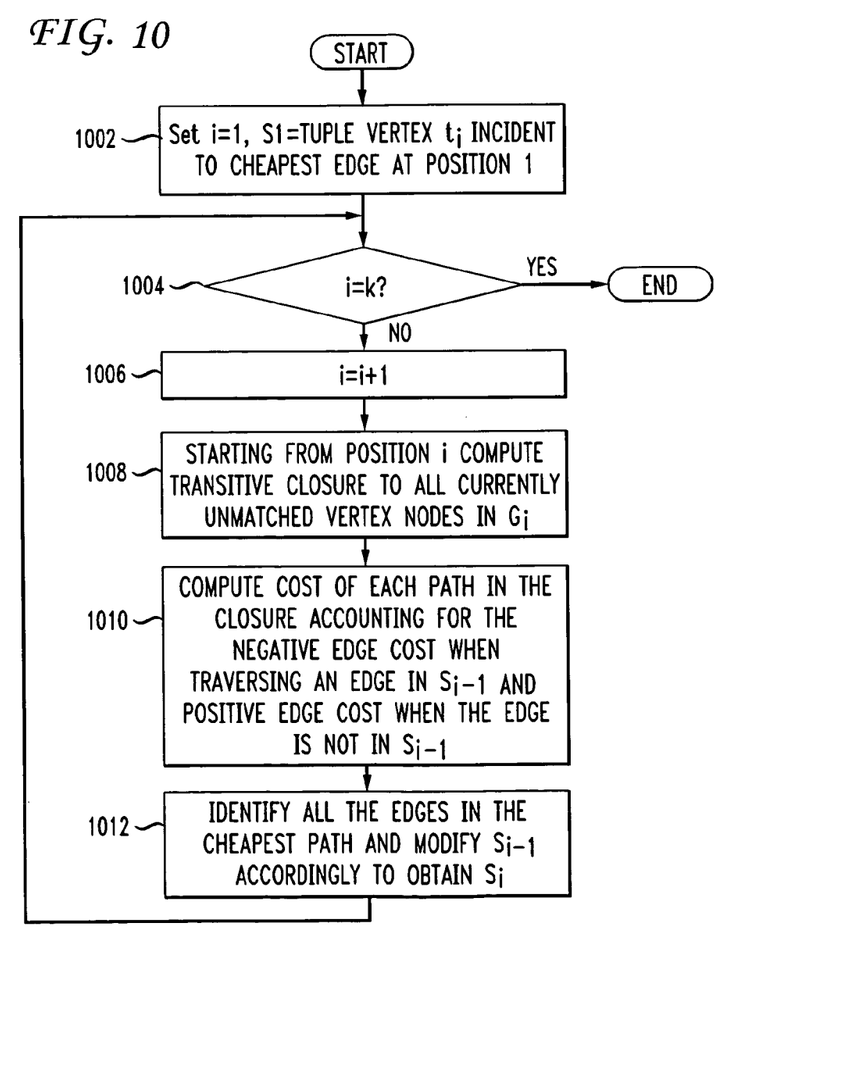
FIG. 10 illustrates a flowchart of an exemplary process that may be used in implementations consistent with the principles of the invention.

The incremental construction of the top-k answer provided by the SSP method, as described in FIG. 10, can be optimized. The optimization may be referred to "Early Stopping" (ES). ES provides a criterion for terminating the search for the least cost path early in the search and subsequently avoiding the computation of the transitive closure.

During the incremental construction of the top-k answer, the SSP method may consider positions successively. When a new position is considered, the paths to all unmatched tuples may be computed. If, at iteration i+1 of the method, the edge of minimum ranking score (cost) incident to position i+1 is also incident to an unmatched vertex tuple, then this edge belongs to the top-(i+1) answer.

OPIMIZATION 1 (Early Stopping) At iteration i+1, if the cheapest edge out of the (i+1)st position is unmatched then the top-(i+1) answer contains this edge.

PROOF: Suppose this is not the case. Let the cost of the edge be b. Then there is a path of less cost from position i+1 to some unmatched element. Consider edges of this path except the first one. Since the cost of the top-(i+1) solution associated with that is less than b and the cost of the first edge itself is at least b the cost of the edges of the path except the first is negative. Suppose the top-i answer is updated to include the positive edges of this path and remove the negative edges. Then, a top-i answer of lower cost is obtained. This is a contradiction.

This optimization enables the search process for the top(i+1) answer to be terminated immediately, without having to evaluate the transitive closure from the (i+1)th position. In this case the top-(i+1) answer may be obtained by extending the top-i answer by the edge of smallest cost out of position i+1 to an unmatched tuple vertex.

Figure 11:
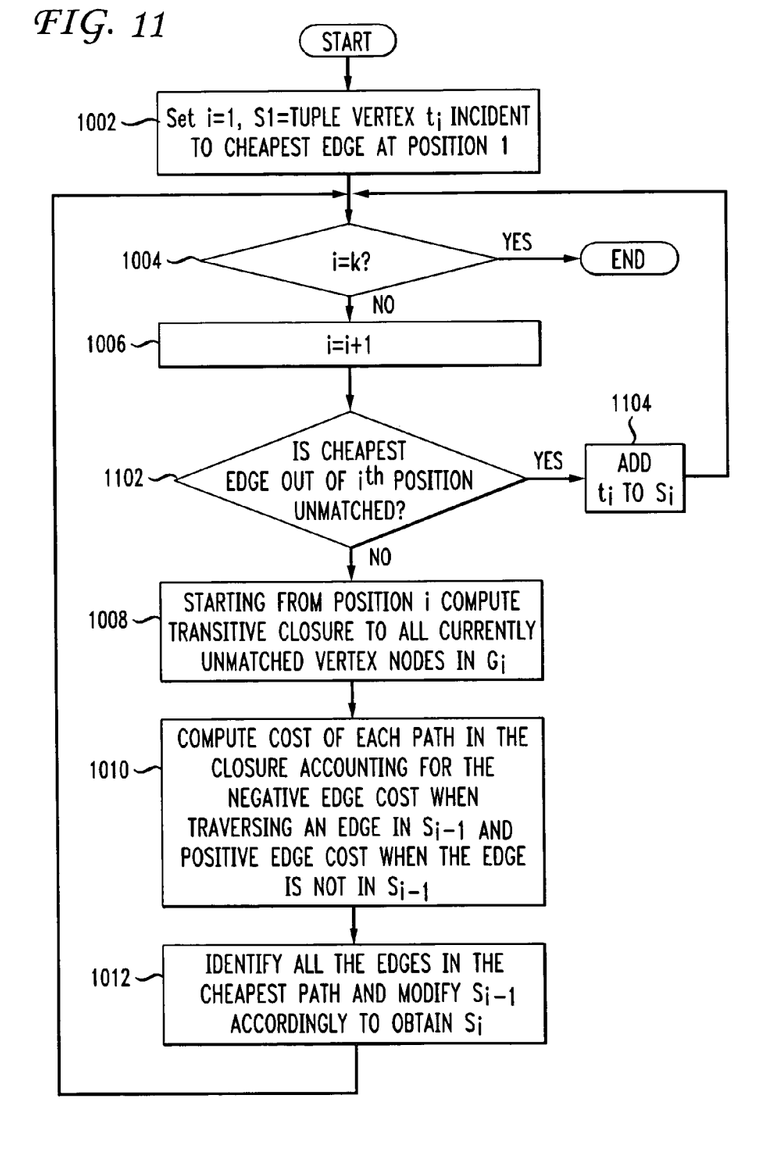
FIG. 11 illustrates a flowchart of an optimized exemplary process that may be used in implementations consistent with the principles of the invention.

FIG. 11 is a flowchart showing the exemplary process of FIG. 10 with the optimization included. All of the acts of FIG. 11 are the same as those of FIG. 10 with the exception of act 1102, which determines whether the cheapest edge for the next position is unmatched to a position. If so, then the vertex node $t_i$ may be added to the top-k solution (act 1104). Otherwise, the process is identical to the process of FIG. 10.

Implementation

FIGS. 8A and 8B show an exemplary implementation of the MHA method in procedural SQL and FIG. 12 illustrates an exemplary implementation of the SSP method in procedural SQL. The procedural SQL statements of FIGS. 8A, 8B and 12 use recursive SQL statements with UNION semantics as specified in the SQL3 standard. However, no major Relational Database Management Systems (RDBMSs) up to date supports an efficient implementation of this construct. In particular, DB2 V8.1 supports this construct only with UNION ALL semantics. As a result, since no duplicate elimination takes place at various stages of the recursion, the number of intermediate tuples generated may be very large, and performance is affected. In order to alleviate this problem, the effects of recursion were simulated as follows: instead of using the recursive statement directly, the join clauses were embedded in an iterative statement, issuing duplicate elimination statements after each iteration. This resulted in great performance benefits.

Miscellaneous

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, hardwired logic may be used in implementations instead of processors, or one or more application specific integrated circuits (ASICs) may be used in implementations consistent with the principles of the invention. Further, implementations consistent with the principles of the invention may have more or fewer acts than as described, or may implement acts in a different order than as shown. For example, acts within the flowcharts of FIGS. 4, 6A, 6B, 10 and 11 may be performed in a different order. Accordingly, the appended claims and their legal equivalents should only define the invention, rather than any specific examples given.

We claim as our invention:

1. A method of performing a database search comprising:
   performing approximate match operations for each of a plurality of attributes for each of a plurality of tuples with respect to a query to create a respective ranking for each of the plurality of attributes; and
   combining the rankings of the plurality of attributes to provide a ranking score for each of the plurality of tuples;
   generating data, including a graph, representing a ranking score of each one of the plurality of tuples according to a position of a respective ranking of each one of the plurality of tuples for a first k positions of the ranking;
   setting, in the graph, a respective ranking score of each of the plurality of tuples according to (n–k) positions to a value that is greater than a largest value of any of the ranking scores for the first k positions of the ranking of the plurality of tuples to complete the generating of the graph, wherein a number of the plurality of tuples is n and k<n; and
   identifying k top ranked ones of the plurality of tuples based at least in part on the generated data and a modified Hungarian method on the generated graph to determine which k ones of the plurality of tuples produce a lowest summed ranking score for the first k positions.

2. The method of claim 1, wherein identifying k top ranked ones of the plurality of tuples based at least in part on the generated data comprises:
   determining a solution that identifies k+1 of the top ranked ones of the plurality of tuples based at least in part on a solution that identifies k of the top ranked ones of the plurality of tuples.

3. The method of claim 2, wherein determining a solution that identifies k+1 of the top ranked ones of the plurality of tuples based at least in part on a solution that identifies k of the top ranked ones of the plurality of tuples further comprises:
   determining which k+1 of the plurality of tuples produces a minimum sum of ranking scores of the k+1 tuples.

4. The method of claim 3, wherein determining a solution that identifies k+1 of the top ranked ones of the plurality of tuples based at least in part on a solution that identifies k of the top ranked ones of the plurality of tuples further comprises:
   determining whether the (k+1)th of the plurality of tuples is part of the solution that identifies k of the top ranked ones of the plurality of tuples;
   completing the solution that identifies the k+1 of the top ranked ones of the plurality of tuples by adding the determined (k+1)th of the plurality of tuples to the k of the top ranked ones of the plurality of the tuples, when the determined (k+1)th of the plurality of tuples is not one of the k of the top ranked ones of the plurality of tuples; and
   completing the solution that identifies the k+1 of the top ranked ones of the plurality of tuples when the (k+1)th of the plurality of tuples is included among the k of the top ranked ones of the plurality of the tuples by:
   adding the (k+1)th of the plurality of tuples to the solution that identifies the k of the top ranked ones of the plurality of tuples;
   adding to the solution that identifies the k of the top ranked ones of the plurality of tuples, ones of the determined k+1 top ranked tuples that are not included among the k of the top ranking ones of the plurality of the tuples, and
   removing any of the k of the top ranked ones of the tuples from the solution that identifies the k of the top ranked ones of the plurality of tuples when the any of the k of the top ranked ones of the tuples are not included in any of the first k positions of the determined k+1 of the top ranked plurality of tuples.

5. A machine-readable storage medium including instructions for at least one processor, wherein the instructions comprise:
   instructions for performing approximate match operations for each of a plurality of attributes for each of a plurality of tuples with respect to a query to create a respective ranking for each of the plurality of attributes;
   instructions for combining the rankings of the plurality of attributes to provide a ranking score for each of the plurality of tuples;
   instructions for generating data, including a graph, representing a ranking score of each one of the plurality of tuples according to a position of a respective ranking of each one of the plurality of tuples for a first k positions of the ranking;
   instructions for setting, in the graph, a respective ranking score of each of the plurality of tuples according to (n–k) positions to a value that is greater than a largest value of any of the ranking scores for the first k positions of the ranking of the plurality of tuples to complete the generating of the graph, wherein a number of the plurality of tuples is n and k<n; and
   instructions for identifying k top ranked ones of the plurality of tuples based at least in part on the generated data and a modified Hungarian method on the generated graph to determine which k ones of the plurality of tuples produce a lowest summed ranking score for the first k positions.

6. The machine-readable storage medium of claim 5, wherein the instructions for identifying k top ranked ones of the plurality of tuples based at least in part on the generated data comprise:
   instructions for determining a solution that identifies k+1 of the top ranked ones of the plurality of tuples based at least in part on a solution that identifies k of the top ranked ones of the plurality of tuples.

7. The machine-readable storage medium of claim 6, wherein the instructions for determining a solution that identifies k+1 of the top ranked ones of the plurality of tuples based at least in part on a solution that identifies k of the top ranked ones of the plurality of tuples further comprises:
   instructions for determining which k+1 of the plurality of tuples produces a minimum sum of ranking scores of the k+1 tuples.

8. The machine-readable storage medium of claim 7, wherein the instructions for determining a solution that identifies k+1 of the top ranked ones of the plurality of tuples based at least in part on a solution that identifies k of the top ranked ones of the plurality of tuples further comprises:
   instructions for determining whether the (k+1)th of the plurality of tuples is part of the solution that identifies k of the top ranked ones of the plurality of tuples;

instructions for completing the solution that identifies the k+1 of the top ranked ones of the plurality of tuples by adding the determined (k+1)th of the plurality of tuples to the k of the top ranked ones of the plurality of the tuples, when the determined (k+1)th of the plurality of tuples is not one of the k of the top ranked ones of the plurality of tuples; and instructions for completing the solution that identifies the k+1 of the top ranked ones of the plurality of tuples when the (k+1)th of the plurality of tuples is included among the k of the top ranked ones of the plurality of the tuples by:

adding the (k+1)th of the plurality of tuples to the solution that identifies the k of the top ranked ones of the plurality of tuples;

adding to the solution that identifies the k of the top ranked ones of the plurality of tuples, ones of the determined k+1 top ranked tuples that are not included among the k of the top ranked ones of the plurality of the tuples, and removing any of the k of the top ranked ones of the tuples from the solution that identifies the k of the top ranked ones of the plurality of tuples when the any of the k of the top ranked ones of the tuples are not included in any of a first k positions of the determined k+1 of the top ranked plurality of tuples.

9. The machine-readable storage medium of claim 5, wherein at least some of the instructions for the at least one processor were written in SQL.

10. A device comprising:
at least one processor;
storage for data and a plurality of instructions; and
a bus arranged to permit communications between the at least one processor and the bus, wherein the device is configured to:
perform approximate match operations for each of a plurality of attributes for each of a plurality of tuples with respect to a query to create a respective ranking for each of the plurality of attributes,
combine the rankings of the plurality of attributes to provide a ranking score for each of the plurality of tuples,
generate data, including a graph, representing a ranking score of each one of the plurality of tuples according to a position of a respective ranking of each one of the plurality of tuples for a first k positions of the ranking;
set, in the graph, a respective ranking score of each of the plurality of tuples according to (n−k) positions to a value that is greater than a largest value of any of the ranking scores for the first k positions of the ranking of the plurality of tuples to complete the generating of the graph, wherein a number of the plurality of tuples is n and k<n; and
identify k top ranked ones of the plurality of tuples based at least in part on the generated data and a modified Hungarian method on the generated graph to determine which k ones of the plurality of tuples produce a lowest summed ranking score for the first k positions.

11. The device of claim 10, wherein the device is further configured to:
determine a solution that identifies k+1 of the top ranked ones of the plurality of tuples based at least in part on a solution that identifies k of the top ranked ones of the plurality of tuples.

12. The device of claim 11, wherein the device is further configured to:
determine which k+1 of the plurality of tuples produces a minimum sum of ranking scores.

13. The device of claim 12, wherein the device is further configured to:
determine whether the (k+1)th of the plurality of tuples is part of the solution that identifies k of the top ranked ones of the plurality of tuples;
complete the solution that identifies the k+1 of the top ranked ones of the plurality of tuples by adding the determined (k+1)th of the plurality of tuples to the k of the top ranked ones of the plurality of the tuples, when the determined (k+1)th of the plurality of tuples is not one of the k of the top ranked ones of the plurality of tuples; and
complete the solution that identifies the k+1 of the top ranked ones of the plurality of tuples when the (k+1)th of the plurality of tuples is included among the k of the top ranked ones of the plurality of the tuples by:
adding the (k+1)th of the plurality of tuples to the solution that identifies the k of the top ranked ones of the plurality of tuples,
adding to the solution that identifies the k of the top ranked ones of the plurality of tuples, ones of the determined k+1 top ranked tuples that are not included among the k of the top ranking ones of the plurality of the tuples, and
removing any of the k of the top ranked ones of the tuples from the solution that identifies the k of the top ranked ones of the plurality of tuples when the any of the k of the top ranked ones of the tuples are not included in any of a first k positions of the determined k+1 of the top ranked plurality of tuples

* * * * *